United States Patent
Li et al.

(10) Patent No.: US 12,443,639 B2
(45) Date of Patent: Oct. 14, 2025

(54) DISPLAY METHOD, APPARATUS, COMPUTER DEVICE AND STORAGE MEDIUM

(71) Applicant: Beijing Zitiao Network Technology Co., Ltd., Beijing (CN)

(72) Inventors: Xiaojie Li, Beijing (CN); Yiyong Li, Beijing (CN); Zhiying Cao, Beijing (CN); Qi Deng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 19 days.

(21) Appl. No.: 18/531,244

(22) Filed: Dec. 6, 2023

(65) Prior Publication Data
US 2024/0211502 A1    Jun. 27, 2024

(30) Foreign Application Priority Data
Dec. 23, 2022   (CN) .......................... 202211668063.5

(51) Int. Cl.
*G06F 16/00*   (2019.01)
*G06F 16/332*   (2019.01)
*G06F 16/335*   (2019.01)
*G06F 40/284*   (2020.01)

(52) U.S. Cl.
CPC ........ *G06F 16/335* (2019.01); *G06F 16/3323* (2019.01); *G06F 40/284* (2020.01)

(58) Field of Classification Search
CPC .............. G06F 16/335; G06F 16/3323; G06F 16/9535; G06F 16/9532; G06F 16/3322; G06F 16/3344; G06F 16/9538
See application file for complete search history.

(56) References Cited

U.S. PATENT DOCUMENTS

| 9,122,758 B1* | 9/2015 | Blower ............... G06F 16/9535 |
| 9,324,028 B1* | 4/2016 | Boshy ....................... G06N 5/04 |
| 12,229,025 B2* | 2/2025 | Li ......................... G06F 11/1658 |
| 2011/0040604 A1* | 2/2011 | Kaib ..................... G06Q 30/02 |
| | | 705/347 |

(Continued)

FOREIGN PATENT DOCUMENTS

CN         113778295 A         12/2021

OTHER PUBLICATIONS

Mathew et al., "Book Recommendation System through Content Based and Collaborative Filtering Method",2016, IEEE,pp. 1-6 (Year: 2016).*

(Continued)

*Primary Examiner* — Alexander Khong

(57) ABSTRACT

The present disclosure provides a display method, apparatus, computer device and storage medium, wherein the method comprises: in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts; displaying the target filtering items; and in response to one of the target filtering items being selected, displaying topic posts associated with the one of the target filtering items.

17 Claims, 5 Drawing Sheets

(56) References Cited

U.S. PATENT DOCUMENTS

| | | | | |
|---|---|---|---|---|
| 2011/0202827 | A1* | 8/2011 | Freishtat | G06F 16/958 |
| | | | | 715/234 |
| 2012/0001919 | A1* | 1/2012 | Lumer | H04L 67/535 |
| | | | | 345/440 |
| 2014/0006424 | A1* | 1/2014 | Al-Kofahi | G06F 16/00 |
| | | | | 707/754 |
| 2014/0164401 | A1* | 6/2014 | Kyaw | G06F 16/23 |
| | | | | 707/751 |
| 2014/0222622 | A1* | 8/2014 | Du | G06F 16/9535 |
| | | | | 705/26.63 |
| 2016/0109941 | A1* | 4/2016 | Govindarajeswaran | |
| | | | | G06F 16/54 |
| | | | | 345/156 |
| 2018/0032882 | A1* | 2/2018 | Joshi | G06N 20/00 |
| 2018/0225365 | A1* | 8/2018 | Altaf | G06F 16/3344 |
| 2019/0108275 | A1* | 4/2019 | Gulli | G06N 3/045 |
| 2019/0114180 | A1* | 4/2019 | Daly | G06F 3/0482 |
| 2019/0179838 | A1* | 6/2019 | Kwon | G06F 40/279 |
| 2020/0019636 | A1* | 1/2020 | Srinivasaraghavan | |
| | | | | G06F 16/9535 |
| 2020/0364280 | A1* | 11/2020 | Puri | G06F 16/9535 |
| 2021/0110475 | A1* | 4/2021 | Singh | G06F 16/24578 |
| 2025/0061157 | A1* | 2/2025 | Tan | G06F 16/9535 |

OTHER PUBLICATIONS

Núñez-Valdez et al., "Creating recommendations on electronic books: A collaborative learning implicit approach", 2015, Science Direct,pp. 1320-1330 (Year: 2015).*

* cited by examiner

DISPLAY METHOD, APPARATUS, COMPUTER DEVICE AND STORAGE MEDIUM

TECHNICAL FIELD

This application claims the benefit of CN application No. 202211668063.5 filed on Dec. 23, 2022, the disclosure of which is herein incorporated by reference in its entirety.

The present disclosure relates to the field of computer technology, and specifically, to a display method, apparatus, computer device and storage medium.

BACKGROUND

There are a wide variety and quantity of online books available for reading on the Internet. In order to quickly find target books from a large number of online books, users can search for the target books from each topic post in book recommendation topics by viewing from each topic post.

SUMMARY

The embodiments of the present disclosure provide at least a display method, apparatus, computer device and storage medium.

In a first aspect, some embodiments of the present disclosure provide a display method, comprising:
  in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts;
  displaying the target filtering items; and
  in response to one of the target filtering items being selected, displaying topic posts associated with the one of the target filtering items.

In one possible implementation, the target filtering items matching the topic posts are determined by:
  determining target attribute characteristics according to common information of various books corresponding to the book information recommended in the topic posts;
  extracting recommendation keywords from the book recommendation information of the topic posts using the target attribute characteristics;
  generating the target filtering items based on the recommendation keywords and the target attribute characteristics.

In one possible implementation, extracting recommendation keywords from the book recommendation information of the topic posts using the target attribute characteristics comprises:
  segmenting the book recommendation information of each of the topic posts respectively according to preset segmentation dimensions, to obtain at least one initial keyword of each of the topic posts under the preset segmentation dimensions; wherein, the preset segmentation dimension includes at least one of a first segmentation dimension determined according to the relationship between characters in a book, a second segmentation dimension determined according to the personalities of characters in a book, and a third segmentation dimension determined according to part-of-speech attributes;
  filtering out recommendation keywords that match the target attribute characteristics from the initial keywords.

In one possible implementation, generating the target filtering items based on the recommendation keywords and the target attribute characteristics comprises:
  generating at least one first filtering item based on the recommendation keywords, and generating at least one second filtering item based on the target attribute characteristics;
  determining the target filtering items based on the at least one first filtering item and the at least one second filtering item.

In one possible implementation, determining the target filtering items based on the at least one first filtering item and the at least one second filtering item comprises:
  determining the number of filtering items corresponding to a target type according to the type of each of the second filtering items;
  in a case that the number of filtering items is greater than a first preset number, determining sorting orders of individual second filtering items of the target type according to a first number of books corresponding to each second filtering item of the target type in order from high to low in quantity;
  taking the second filtering items whose sorting order is greater than a preset order, the at least one first filtering item, and other second filtering items than the second filtering items of the target type as the target filtering items.

In one possible implementation, the second filtering item includes a first sub-filtering item for characterizing a book type of a book;
  the generating at least one second filtering item based on the target attribute characteristics comprising:
  recognizing the book recommendation topics semantically to determine book search intention; the book search intention being used to indicate attribute characteristics of the book to be found corresponding to the book recommendation topics;
  in a case that the type of the book search intention complies with a first preset type, acquiring reading type indication information corresponding to the user who triggers the book recommendation topic; the first preset type including a non-directional type and/or a score being higher than a set threshold type; the reading type indication information being used to indicate each of book types of interest;
  determining a second number of a first book under each of the book types of interest according to the book type of each of the books indicated by the target attribute characteristics;
  generating at least one of the first sub-filtering items according to the corresponding second number of book types of interest being greater than a second preset number.

In one possible implementation, the second filtering item includes a second sub-filtering item for characterizing a book genre of a book;
  the generating at least one second filtering item based on the target attribute characteristics comprising:
  in a case that the type of book search intention meets a second preset type, determining a third number of topic posts in the book recommendation topics; the second preset type including at least one preset book genre type;

in a case that the third number is greater than a third preset number, determining a fourth number of a second book that matches the type of the book search intention according to the book genre of each of the book indicated by the target attribute characteristics;

in a case that the ratio between the fourth number and the total number of books corresponding to the book information is greater than a preset ratio, generating at least one of the second sub-filtering items according to the type of the book search intention.

In one possible implementation, the second filtering item includes a third sub-filtering item for characterizing a completed status of a book and/or a fourth sub-filtering item for characterizing a book score for a book;

the generating at least one second filtering item based on the target attribute characteristics comprising:

in a case that it is determined that there is a book whose update status is a completed status based on the book update status of each of the books indicated by the target attribute characteristics, generating the third sub-filtering item; and/or in a case that it is determined that there is a book with a book score greater than a set threshold based on the book score of each of the books indicated by the target attribute characteristics, generating the fourth sub-filtering item.

In a second aspect, some embodiments of the present disclosure further provide a display apparatus, comprising:

an acquisition module configured to, in response to a trigger operation for any of book recommendation topics, acquire a plurality of topic posts under the book recommendation topic, and target filtering items matching the topic posts; wherein the target filtering items are determined based on book recommendation information of the topic posts and book information recommended in the topic posts;

a first display module configured to display the target filtering items; and a second display module configured to, in response to one of the target filtering items being selected, display topic posts associated with the one of the target filtering items.

In a third aspect, some implementations of the present disclosure further provide a computer device, a processor, and a memory having machine-readable instructions executable by the processor stored thereon, the processor being configured to execute the machine-readable instructions stored in the memory, when the machine-readable instructions are executed by the processor, when the machine-readable instructions are executed by the processor, execute the first aspect above, or the steps in any one of the possible implementations in the first aspect.

In a fourth aspect, some implementations of the present disclosure further provide a computer-readable storage medium having a computer program stored thereon, which, when run, executes the first aspect above, or the steps in any one of the possible implementations in the first aspect.

For a description of the above display apparatus, computer device, and computer-readable storage medium, refer to the description of the above display method, which will not be repeated here again.

In order to make the above objects, features and advantages of the present disclosure more obvious and understandable, preferred embodiments are enumerated below, and are described in detail below with reference to the accompanying drawings.

BRIEF DESCRIPTION OF THE DRAWINGS

In order to explain the technical solutions of the embodiments of the present disclosure more clearly, the drawings need to be used in the embodiments will be briefly introduced below. The drawings here are incorporated into and constitute a part of the specification. These drawings illustrate embodiments consistent with the present disclosure and, together with the description, serve to explain the technical solutions of the present disclosure. It should be understood that the drawings below only illustrate certain embodiments of the present disclosure, and therefore should not be regarded as limiting the scope. Those ordinary skill in the art may also obtain other relevant drawings in view of these drawings without exerting creative efforts.

DETAILED DESCRIPTION

Figure 1:
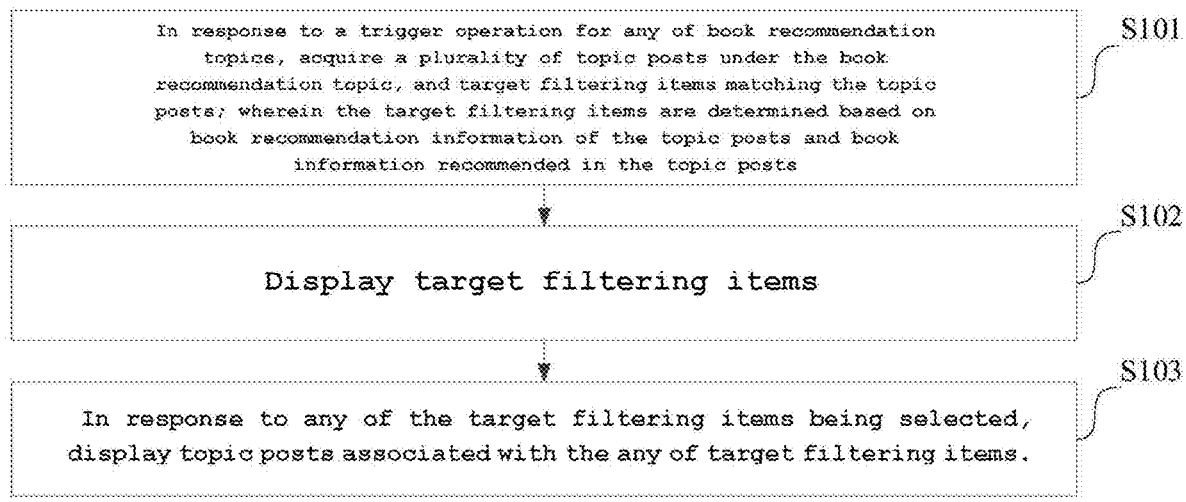
FIG. 1 shows a flow chart of a display method provided by some embodiments of the present disclosure.

In order to make the objects, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are only some of the embodiments of the present disclosure, not all of the embodiments. The components of the disclosed embodiments generally described and illustrated herein may be arranged and designed in a variety of different configurations. Therefore, the following detailed description of the embodiments of the disclosure is not intended to limit the scope of the claimed disclosure, but rather to represent selected embodiments of the disclosure. Based on the embodiments of the present disclosure, all other embodiments obtained by those skilled in the art without any creative efforts shall fall within the scope of protection of the present disclosure.

In addition, the terms "first", "second", etc. in the description and claims and the above drawings of the embodiments of the present disclosure are used to distinguish similar objects, and are not necessarily used to describe a specific order or sequence. It is to be understood that the data so used are interchangeable under appropriate circumstances so that the embodiments described herein can be practiced in sequences other than those illustrated or described herein.

"A plurality or several" mentioned herein means two or more. "And/or" describes association relationship between related objects, indicating that there can be three relationships. For example, A and/or B can mean: A exists alone, A and B exist simultaneously, and B exists alone. The character "/" generally indicates that the related objects are in an "or" relationship.

There are a wide variety and quantity of online books available for reading on the Internet. In order to quickly find target books from a large number of online books, users can search for the target books from each topic post in book recommendation topics by viewing from each topic post.

However, since the number of topic posts in the book recommendation topics is not fixed, and different topic posts come from different users, the types and quantities of books included in each topic post are also not fixed, so if the users want to find the target books, they still need to read the topic posts in detail. As such, it not only increases the complexity of acquiring the target books, but also reduces the efficiency of acquiring the target books. Research has found that in daily life, most users have the habit of reading online through the Internet. However, due to the rich variety and quantity of online books available for reading on the Internet, how to help find target books from a large number of online books for users to read has become a problem worthy of attention. Normally, users can search for target books by actively initiating a book recommendation topic and then checking topic posts answered by other users under the book recommendation topic. Alternatively, the users can also search for target books by viewing topic posts in published book recommendation topics. However, no matter which approach is used to search, the search efficiency of the target book will be affected by the number of topic posts under the book recommendation topic and the type and number of books in the topic posts, resulting in the search efficiency of books not being guaranteed.

Based on the above research, the present disclosure provides a display solution. Since the filtering items are determined based on the book recommendation information of each topic post and the book information recommended in each topic post, each of the acquired target filtering items can be associated with attribute information of a certain number of topic posts. By acquiring and displaying target filtering items that match a topic post, users may be provided with filtering options, and then by responding to one of the target filtering items being selected, and displaying topic posts associated with the one of target filtering items on current page, it is possible to implement that each topic post under the book recommendation topic can be flexibly filtered according to each target filtering item to obtain topic posts that are in line with the needs of finding books. Then, the filtered topic posts are used to search for books, which can effectively improve the efficiency of book search.

The defects that exist in the above solutions are all the results obtained by the inventor after practice and careful study. Therefore, the discovery process of the above problems and the solutions proposed by the present disclosure for the above problems below all should be the contributions made by the inventor to this disclosure during the process of this disclosure.

It should be noted that similar reference numerals and letters represent similar items in the following drawings, therefore, once an item is defined in one drawing, it does not need to be further defined and explained in subsequent drawings.

It can be understood that before using the technical solutions disclosed in each embodiment of the present disclosure, users should be informed of the type, scope of use, usage scenarios, etc. of the personal information involved in the present disclosure in an appropriate manner in accordance with relevant laws and regulations and obtain authorization from the users.

In order to facilitate understanding of these embodiments, a display method disclosed in the embodiments of the present disclosure will be first introduced in detail. The execution subject of the display method provided by the embodiments of the present disclosure is generally a terminal device or other processing device with certain computing capabilities, wherein the terminal device may be a User Equipment (UE), a mobile device, a user terminal, a terminal, a Personal Digital Assistant Device (PDA), a handheld device, a computer device, etc.; in some possible implementations, the display method may be implemented by a processor calling computer readable instructions stored in a memory.

The display method provided by the embodiments of the present disclosure will be described below by taking the execution subject as a computer device as an example.

As shown in FIG. 1, it is a flow chart of a display method provided by some embodiments of the present disclosure and may comprise following steps:

S101: in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts.

Here, the book recommendation topic is a topic initiated by a user for finding a book. Each book recommendation topic may include answers to the book recommendation topic from one or more users. One answer is referred to as one topic post. One topic post may include book recommendation information and book information. Specifically, the book information may be book information of books recommended in the topic post, and the book information may be, for example, book name, book cover, attribute characteristics, book author and other information. The book recommendation information used to characterize reasons for the user to recommend each book in the topic post.

Target filtering items are determined based on book recommendation information of each topic post and book information in each topic post. One topic post may have one or more target filtering items, and different topic posts have different numbers and types of target filtering items. The target filtering items may be used to filter out topic posts with the target filtering items from multiple topic posts under the book recommendation topic. For each target filtering item that matches a topic post, there is at least one topic post with that target filtering item.

A trigger operation for a book recommendation topic may be an operation for a user to view the book recommendation topic, such as an operation for clicking on the book recommendation topic, or it may also be an operation for the user to actively search for the book recommendation topic. Exemplarily, in a book discussion community, multiple book recommendation topics initiated by multiple users may be displayed. In a case that a user determines that he or she needs to view a certain book recommendation topic, the user can click on that book recommendation topic to trigger the book recommendation topic.

Exemplarily, for each book recommendation topic in the book discussion community, target filtering items that match each topic post in the book recommendation topic respectively may be determined first according to book recommendation information of each topic post in the book recommendation topic and book information in each topic post. Here, since the topic posts may include multiple ones, and one or more target filtering items may be determined from one topic post, the ultimately determined target filtering items that match each topic post may include multiple target filtering items. Thereafter, in response to a click operation on any book recommendation topic in the book discussion community by the user, each topic post under the book recommendation topic is acquired, as well as the predetermined target filtering items matching the topic post.

S102: displaying target filtering items.

During specific implementation, after acquiring target filtering items matching topic posts under a book recommendation topic, it may jump to a details page corresponding to the triggered book recommendation topic, and display the target filtering items in the details page.

Figure 2:
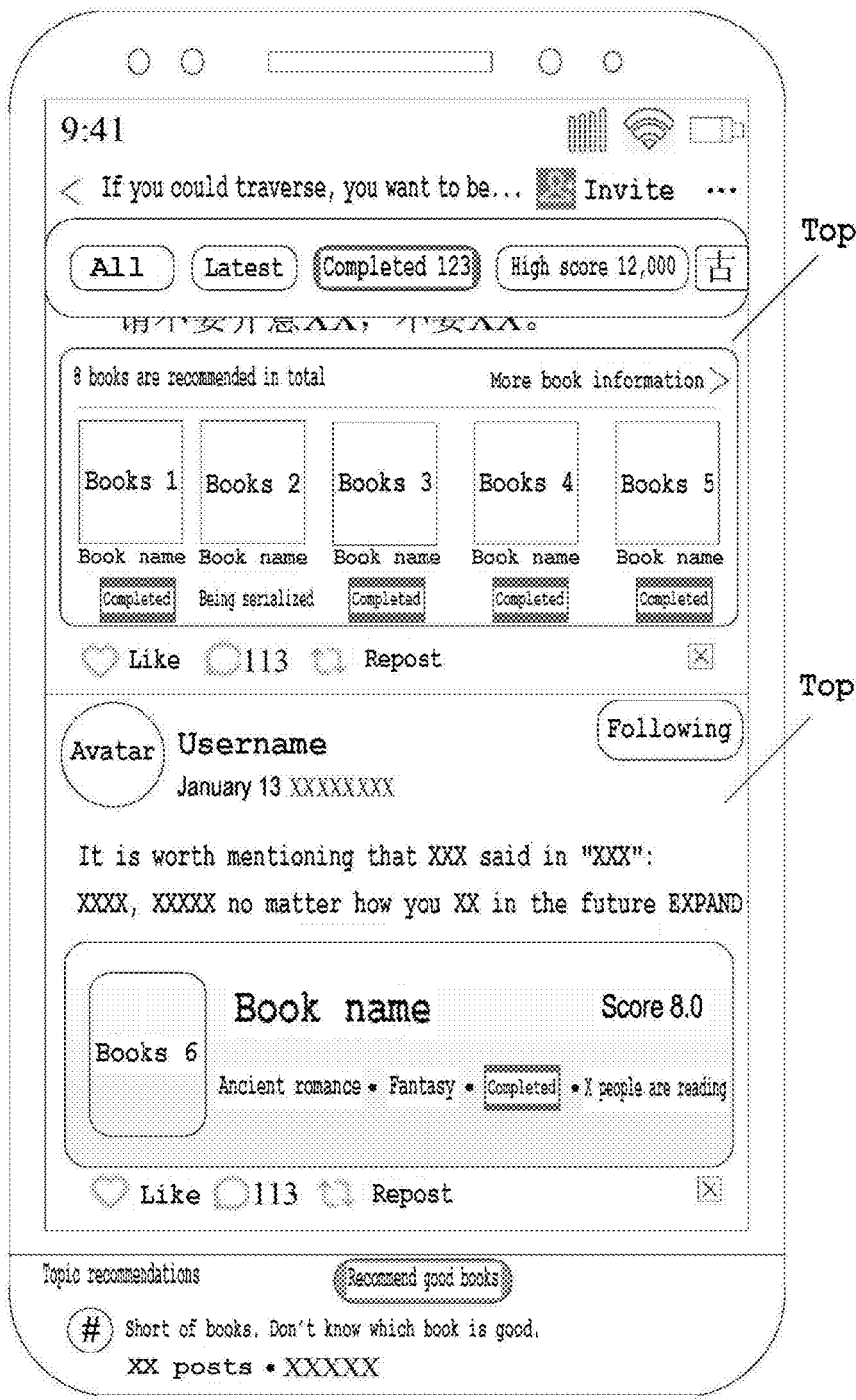
FIG. 2 shows a schematic diagram of a details page provided by some embodiments of the present disclosure.

As shown in FIG. 2, it is a schematic diagram of a details page provided by some embodiments of the present disclosure, wherein, the details page displays the name of a book recommendation topic (i.e., "If you could traverse, you want to be . . . " in FIG. 2), multiple target filtering items arranged according to preset arrangement rules, and the number of topic posts that meet requirements under the target filtering items (All 123, Latest, Completed 123, High score 12,000, Ancient romance in FIG. 2). Here, it should be noted that when the number of target filtering items is large and the page cannot fully display each target filtering item, in response to a sliding operation by the user in the area where the target filtering item is displayed, other target filtering items may be displayed according to the sliding distance. In FIG. 2, there are two topic posts, Topic Post 1 and Topic Post 2. Book information in the first topic post is book information corresponding to five books (i.e., Book 1~ Book 5) respectively. The recommend good book button in FIG. 2 may be used to generate a book recommendation page in response to a click operation by the user. Thereafter, the user can actively recommend books on this page. In addition, in order to ensure that book 6 in topic post 2 with the target filtering item "Completed" may be highlighted, in a case that there is too much book recommendation information in topic post 2, the book recommendation information may be folded, and an expand button may be displayed so that the book recommendation information is fully displayed in response to a trigger operation on the expand button.

S103: in response to one of the target filtering items being selected, displaying topic posts associated with the one of target filtering items.

Here, the topic posts associated with the target filtering item is topic posts with the target filtering item. The target filtering items the topic post has may include multiple, and the multiple target filtering items may include those determined from the book recommendation information and/or those that each book in the topic post has. The target filtering items determined from the book recommendation information may also be referred to as target filtering items that the book recommendation information has.

Exemplarily, in response to a click operation by a user on one of target filtering items displayed in a details page, each topic post associated with the target filtering item may be displayed in the details page, and when each associated topic post is displayed, each target filtering item existing in the topic post may also be highlighted.

For example, in FIG. 2, the target filtering item "Completed" is selected, because there is no target filtering item in the book recommendation information of topic post 1, and book 1 and books 3 to 5 in topic post 1 have the target filtering item "Completed", so in the details page, only part of the book recommendation information of topic post 1 may be displayed, the entire content of the book information may be displayed, and the target filtering item "Completed" that Book 1, Books 3 to 5 have respectively may be highlighted. Since topic post 2 is displayed below topic post 1, even if there are no target filtering items in the book recommendation information in topic post 2, in order to ensure the coherence of the page content, the book recommendation information in topic post 2 will be displayed. Wherein, book 6 corresponding to the book information in the topic post has the target filtering item "Completed", so this target filtering item will also be highlighted.

Figure 3:
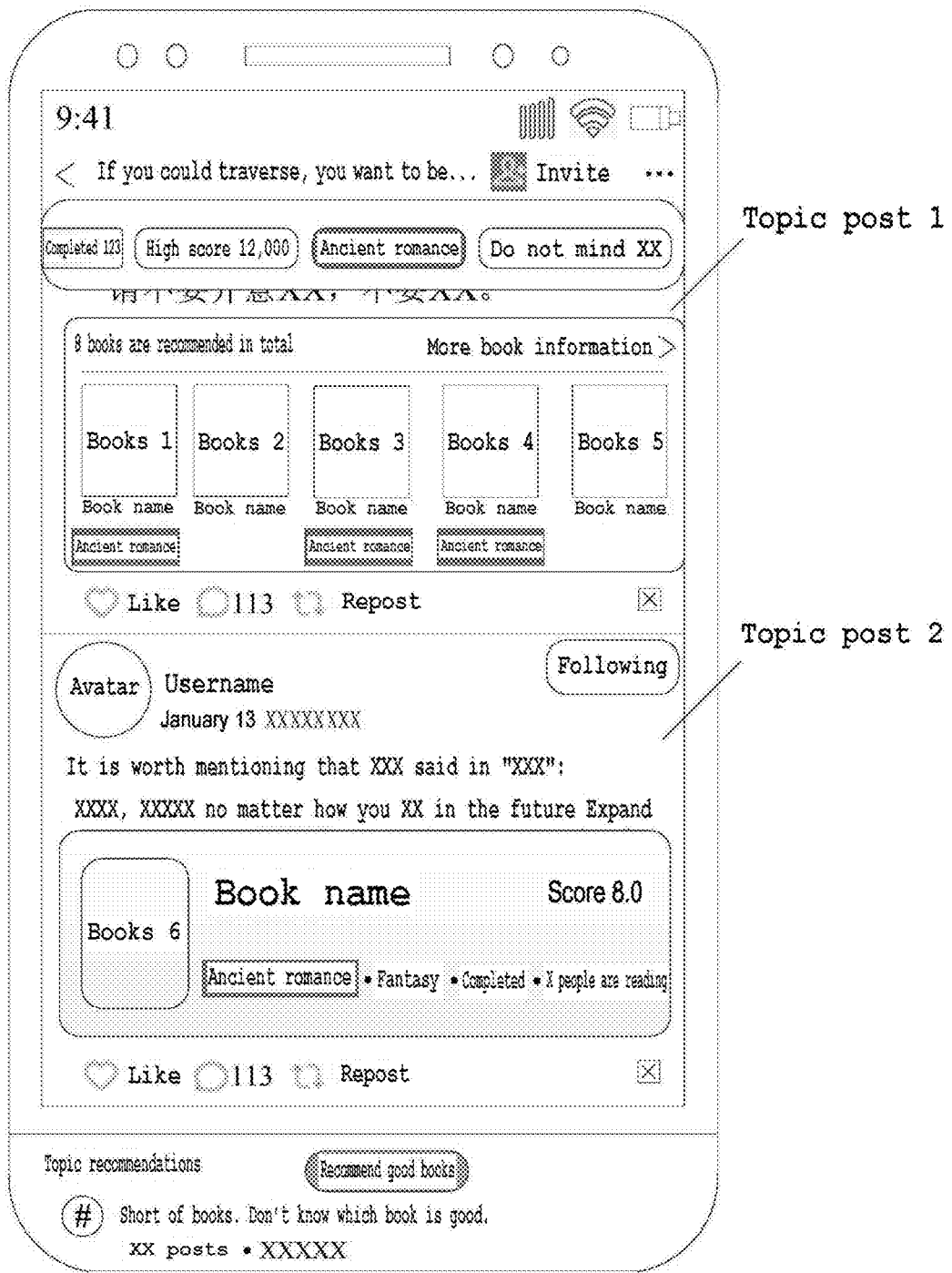
FIG. 3 shows a schematic diagram of displaying other target filtering items provided by some embodiments of the present disclosure.

Of course, in response to a sliding operation of the user on the area where the target filtering item is located in FIG. 2, other target filtering items may also be displayed accordingly according to the sliding distance. As shown in FIG. 3, it is a schematic diagram of displaying other target filtering items provided by some embodiments of the present disclosure. The target filtering items shown in FIG. 3 include "Completed", "High score", "Ancient romance" and "Don't mind XX".

Exemplarily, for FIG. 3, the target filtering item "Ancient romance" is selected, and the topic posts displayed in FIG. 3 are still topic posts 1 and topic posts 2, wherein Book 1, Book 3 and Book 4 in topic post 1 all have the target filtering item "Ancient romance", so they may be highlighted. Book 6 in topic post 2 has the target filtering item "Ancient romance", so this target filtering item will also be highlighted.

Figure 4:
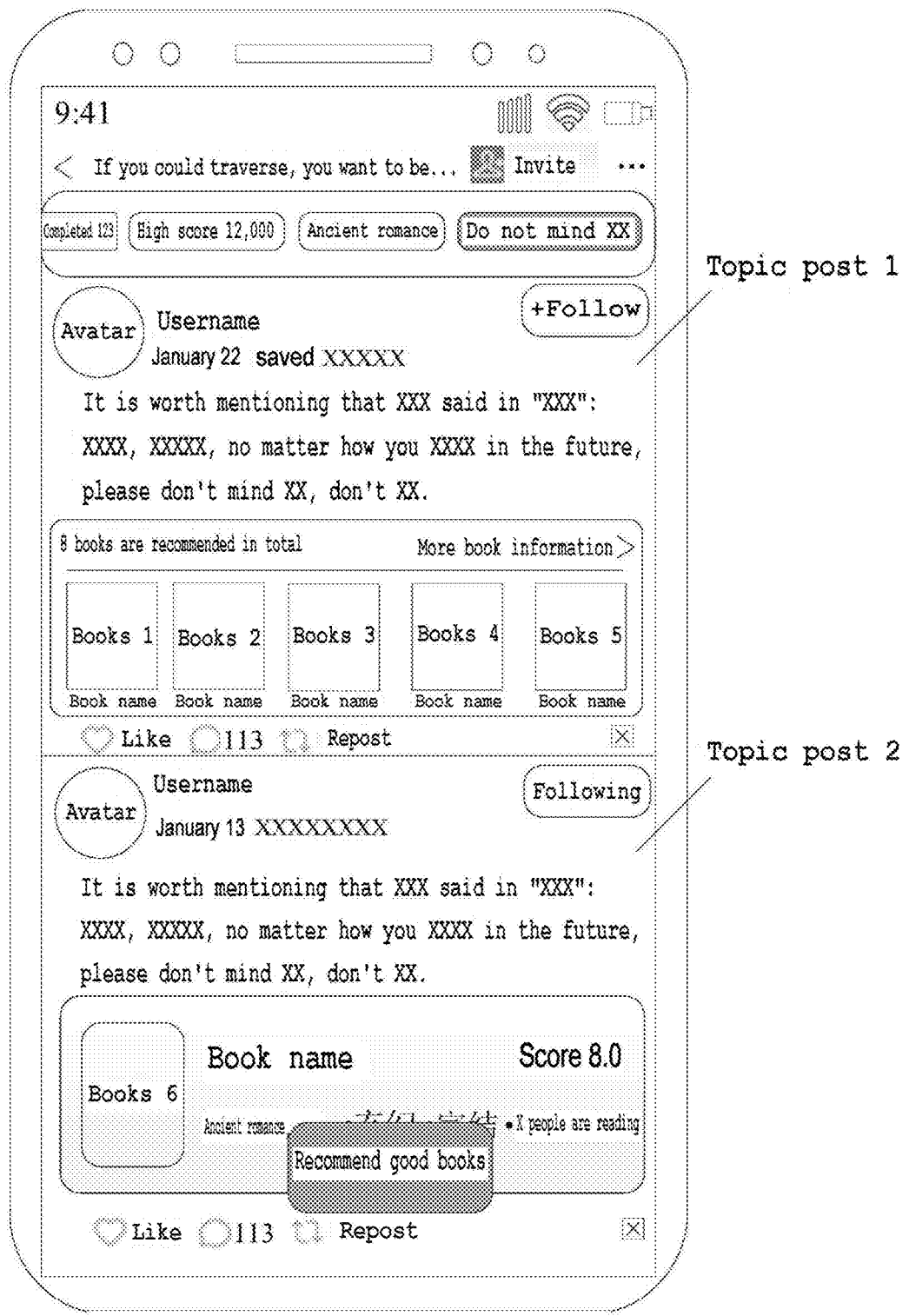
FIG. 4 shows a schematic diagram of another details page provided by some embodiments of the present disclosure.

As shown in FIG. 4, it is a schematic diagram of another details page provided by some embodiments of the present disclosure, wherein the target filtering items shown in FIG. 4 are consistent with the target filtering items in FIG. 3, and the target filtering item "Don't mind XX" in FIG. 4 is selected. The topic posts shown in FIG. 4 include topic post 1 and topic post 2. Since the book recommendation information in topic post 1 has the target filtering item "Don't mind XX", the target filtering item in the book recommendation information may be highlighted. The book recommendation information in topic post 2 also has the target filtering item "Don't mind XX", so it will also be highlighted.

In this way, since the filtering items are determined based on the book recommendation information of each topic post and the book information recommended in each topic post, each of the acquired target filtering items can be associated with attribute information of a certain number of topic posts. By acquiring and displaying target filtering items that match a topic post, users may be provided with filtering options, and then by responding to one of the target filtering items being selected, and displaying topic posts associated with the one of target filtering items on current page, it is possible to implement that each topic post under the book recommendation topic can be flexibly filtered according to each target filtering item to obtain topic posts that are in line with the needs of finding books. Then, the filtered topic posts are used to search for books, which can effectively improve the efficiency of book search.

In some embodiments, target filtering items matching topic posts may be determined according to the following steps 1 to 3:

Step 1: determining target attribute characteristics according to common information of various books corresponding to book information recommended in the topic posts.

Here, various books corresponding to the book information are various books recommended in the topic posts. For example, the various books corresponding to the book information recommended in topic post 1 in FIG. 2 are books 1 to 5. The common information may be information in common by at least two books in various book. The common information may be information such as common book content, common book genres, common book update status, common book plots, common book authors, common book scores, common character relationships, common character personalities, etc. In addition, common information may also include common attributes of books, for example, information such as the name of books, the publisher of books, etc. The target attribute characteristics are characteristic for characterizing common information. Accordingly, the target attribute characteristics may specifically include information such as book update status of a book, book score of a book, book type of a book, book genre of a book, relationship and personality of characters in a book, etc., wherein the book update status may specifically include two statuses: completed and serialized. The book genre may specifically include publishing genre, comic theme and audio book genre. The book type may be, for example, ancient romance, fairy tale, martial art, science fiction, suspense, ancient legends, etc.

During specific implementation, for any topic post, various books corresponding to the book information recommended in the topic post may be analyzed for content respectively, and common information of the various books is determined based on the analysis results and the book information of the various books. The common information may then be used as target attribute characteristics.

Step 2: extracting recommendation keywords from the book recommendation information of the topic posts using the target attribute characteristics.

Here, the recommendation keywords are keywords related to the target attribute characteristics acquired after segmenting the book recommendation information. For example, "Don't mind XX" in the book recommendation information of topic post 1 in FIG. 2 is a segmented recommendation keyword.

Exemplarily, for each topic post, a pre-trained word segmentation network may be used to perform word segmentation processing on the book recommendation information of the topic post according to the target attribute characteristics, so as to obtain each recommendation keyword related to the target attribute characteristics.

In some embodiments, for the step of "extracting recommendation keywords from book recommendation information using the target attribute characteristics", it may be implemented according to the steps below:

segmenting the book recommendation information of each of the topic posts respectively according to preset segmentation dimensions, to obtain at least one initial keyword of each of the topic posts under the preset segmentation dimensions;

wherein, the preset segmentation dimension includes at least one of a first segmentation dimension determined according to the relationship between characters in a book, a second segmentation dimension determined according to the personalities of characters in a book, and a third segmentation dimension determined according to part-of-speech attributes.

Exemplarily, the first segmentation dimension is determined according to the character relationship that the characters in the book may have. Specifically, a first segmentation rule related to the first segmentation dimension may be set in advance. The first segmentation rule indicates that there is a first part-of-speech collocation rule. For example, for the first segmentation dimension, the first part-of-speech collocation rule may include but not limited to the following rules: actress+verb+actor, actor+verb+actress, actress is a XX of actor, actor is a XX of actress, no CP, no actress, no actor, etc. Wherein, the actress and actor in the first part-of-speech collocation rule may also be specific character name.

The second segmentation dimension may be determined according to the possible personalities/roles of the characters in the book. Specifically, a second segmentation rule related to the second segmentation dimension may be set in advance. The second segmentation rule indicates that there is a second part-of-speech collocation rule. For example, for the second segmentation dimension, the second part-of-speech collocation rule may include but not limited to the following rules: actress+adjective, actor+adjective, actress is +noun/adjective, actor is +noun/adjective, female+adjective, male+adjective, actor and actress are+noun/adjective, etc. Wherein, the actress and actor in the second part-of-speech collocation rule may also be specific character names.

The third segmentation dimension may be a segmentation dimension determined according to part-of-speech attributes, wherein the part-of-speech attributes may be nouns, adjectives, verbs, etc.

It should be noted that, for each topic post, when segmenting book recommendation information of a topic post according to various preset segmentation dimensions, the length of characters of various initial keyword obtained may be any length.

During specific implementation, for each topic post, the first segmentation dimension, the second segmentation dimension and the third segmentation dimension may be used to segment book recommendation information of a topic post respectively, to obtain initial keywords under the three segmentation dimensions.

In this way, using multiple segmentation dimensions to segment book recommendation information can improve the comprehensiveness and accuracy of the obtained recommendation keywords.

Then, recommendation keywords that match the target attribute characteristics may be filtered out from the initial keywords.

Exemplarily, after obtaining the initial keywords, the correlation between each initial keyword and various target attribute characteristics may be determined. If the correlation between an initial keyword and one of the target attribute characteristics is greater than a set value, the initial keyword may be used as a recommendation keyword; if the correlation between an initial keyword and one of the target attribute characteristics is not greater than the set value, the initial keyword may be filtered.

Step 3: generating the target filtering items based on the recommendation keywords and the target attribute characteristics.

Exemplarily, the filtered recommendation keywords may be directly used as the name of the target filtering item, and a target filtering item with this name may be generated. At the same time, book update status, book score, book type, book genre, etc. indicated by the target attribute characteristics may be used as the name of the target filtering item, and a target filtering item with such a name may be generated.

In some embodiments, for the above step 3, it may be implemented according to the following S1 and S2:

S1: generating at least one first filtering item based on the recommendation keywords, and generating at least one second filtering item based on the target attribute characteristics.

Here, the first filtering item is a filtering item characterized by recommendation keywords, and the second filtering item is filtering item characterized by target attribute characteristics.

Exemplarily, recommendation keywords may be filtered first to obtain at least one recommendation keyword that may be used to generate a first filtering item. For example, the number of topic posts corresponding to each recommendation keyword may be calculated, and recommendation keywords whose number is greater than a certain value may be used as filtered recommendation keywords. Then, a first filtered item with a corresponding name may be generated according to various filtered recommendation keywords. At the same time, at least one target attribute characteristics to be used may be filtered out from the target attribute characteristics according to the number of books with the various target attribute characteristics, and then the various target attribute characteristics to be used may be used as the name of the second filtering item, and a second filtering item with the corresponding name may be generated.

In other embodiments, the second filtering item may include a first sub-filtering item for characterizing book type of a book. Exemplarily, the first sub-filtering item may be the target filtering item for characterizing the ancient romance type in FIG. 3. For the step of generating a second filtering item based on the target attribute characteristics, it may be implemented according to the following steps:

P1: recognizing the book recommendation topics semantically to determine book search intention; the book search intention being used to indicate attribute characteristics of the book to be found corresponding to the book recommendation topics.

Here, the attribute characteristics may be, for example, information such as high score, book type, book genre, etc. The book search intention may characterize what kind of books a user wants to be recommended. The book search intention may have different types, specifically, it may include a non-directional type, a score being higher than a set threshold type, a search for published books type, a search for comic books type, a search for audio books type, and a multi-intention type. Wherein, the non-directional type is a type without clear intention. For example, in a case that a book recommendation topic is "Short of books, please recommend", the type of book search intention of the book recommendation topic is the non-directional type. For the score being higher than a set threshold type, for example, the book search intention corresponding to a book recommendation topic "Please recommend high-scoring novels" corresponds to this type. For the multi-intention type, for example, the type of book search intention corresponding to a book recommendation topic "If it is possible to traverse, possess a high-powered actor with superb medical skills" is a multi-intention type. In some embodiments, types other than the non-directional type, the score being higher than a set threshold type, the searching for published books type, the searching for comic books type, and the searching for audio books type may be considered to be a multi-intention type.

Exemplarily, a semantic recognition neural network may be used to perform semantic recognition on book recommendation topics, determine semantic information of the book recommendation topics, and determine book search intention characterized by the book recommendation topics according to the semantic information.

Wherein, the book search intention may also be determined according to the classification of the book recommendation topics and titles of the book recommendation topics. For example, in a case that the classification of a book recommendation topic is publishing classification or the title of a book recommendation topic includes information such as publishing classification, published book name, publishing author, etc., it may be determined that the type of book search intention corresponding to the book recommendation topic is the searching for published books type. Similarly, in a case that the classification of the book recommendation topic is a comic book classification or the title of the book recommendation topic includes information such as comic book classification, comic book name, comic book author, etc., it may be determined that the type of book search intention corresponding to the book recommendation topic is the searching for comic books type. In a case that the classification of the book recommendation topic is an audio book classification or the title of the book recommendation topic includes information such as audio book classification, audio book name, audio book author, etc., it may be determined that the type of book search intention corresponding to the book recommendation topic is the searching for audio books type.

P2: in a case that the type of the book search intention complies with a first preset type, acquiring reading type indication information corresponding to the user who triggers the book recommendation topic; the first preset type including a non-directional type and/or a score being higher than a set threshold type; the reading type indication information being used to indicate each of book types of interest.

Here, the reading type indication information is information to be acquired with the user's authorization, and the book types of interest is the type of books that the user likes to read. It is understandable that the reading type indication information is used to indicate the types of various books that the user likes to read. For example, the reading type indication information is used to indicate five book types that the user likes to read.

In specific implementation, after determining the book search intention, the type of the book search intention may be determined first. Then, in a case that it is determined that the type is in line with a first preset type, the reading type indication information corresponding to the user who triggered the book recommendation topic may be acquired.

P3: determining a second number of a first book under each of the book types of interest according to the book type of each of the books indicated by the target attribute characteristics.

Here, the target attribute characteristics may indicate the book type of various books, and the first book is a book whose book type is the book type of interest.

During specific implementation, for each book type of interest, a second number of first books whose book type matches the book type of interest may be determined according to the book type of various books indicated by the target attribute characteristics.

P4: generating at least one of the first sub-filtering items according to the corresponding second number of book types of interest being greater than a second preset number.

Here, the second preset number may be set based on experience, which is not specifically limited in the embodiments of the present disclosure. For example, the second preset number may be 6, 8, 10, etc. The second number corresponding to a book type of interest is the second number of the first books under the book type of interest.

During specific implementation, it is possible to filter out the corresponding second number of book types of interest that are greater than the second preset number, and generate a first sub-filtering item for characterizing each of the filtered book types of interest, that is, the name of the first sub-filtering item is each of the filtered book types of interest.

In this way, by generating the first sub-filtering item, it is convenient for users to filter topic posts according to book types.

In other embodiments, in a case that the type of book search intention is in line with the second preset type, the second filtering item may also include a second sub-filtering item for characterizing the book genre of a book, wherein, the second preset type includes at least one preset book genre type. Specifically, the second preset type may include a searching for published books type corresponding to a publishing genre, a searching for comic books type corresponding to a comic book genre, and a searching for audio books type corresponding to an audio book genre. For the step of generating second filtering items based on target attribute characteristics, it may be implemented according to following steps:

T1: determining a third number of topic posts in the book recommendation topics.

Exemplarily, in a case that the type of book search intention complies with a second preset type, the number of topic posts in the book recommendation topic, that is, the third number, may be determined first.

T2: in a case that the third number is greater than a third preset number, determining a fourth number of a second book that matches the type of the book search intention according to the book genre of each of the book indicated by the target attribute characteristics.

Here, the target attribute characteristics may also indicate the book genre of various books, and the third preset number may be set according to experience, which is not specifically limited in the embodiments of the present disclosure. For example, the third preset number may be 6, 7, 8, etc. The second book is a book whose genre is consistent with the type of book search intention.

Exemplarily, after determining the third number, it may be determined whether the third number is greater than the third preset number. If so, it is possible to find a fourth number of second books whose genre matches the type of book search intention according to the book genre of various books indicated by the target attribute characteristics, from all the books recommended by the topic posts. For example, in a case that the type of the book search intention is the searching for published books type, the book genre is determined to be a fourth number of second books with a published genre.

T3: in a case that the ratio between the fourth number and the total number of books corresponding to the book information is greater than a preset ratio, generating at least one of the second sub-filtering items according to the type of the book search intention.

Here, the total number of books is the sum of the number of books included in various topic posts under the book recommendation topic. The preset ratio may be set according to experience, which is not specifically limited in the embodiments of the present disclosure. For example, the preset ratio may be 0.7, 0.8, etc. In a case that the type of the book search intention is the searching for published books type, the second preset type that the type of the book searching intention is in line with is the searching for published books type; in a case that the type of the book searching intention is the searching for comic books type, the second preset type that the type of book search intention is in line with is the searching for comic books type; in a case that the type of book search intention is the searching for audio books type, the second preset type that the type of book search intention is in line with is the searching for audio books type.

Exemplarily, in a case that the ratio of the fourth number of second books whose genre is publishing genre to the total number of books is greater than 0.7, a second sub-filtering item named as Published Books may be generated. Of course, multiple second sub-filtering items may also be generated according to the type of book search intention. For example, in a case that the ratio of the fourth number of second books with the publishing genre to the total number of books is greater than 0.7, a second sub-filtering item named as Published Books and a second sub-filtering item named as Find Published Books, and a second sub-filtering item named as Unpublished Books may be generated.

In this way, by generating the second sub-filtering items, it is convenient for users to filter topic posts according to book genres.

In other embodiments, for the second filtering item, the second filtering item may include a third sub-filtering item for characterizing the completed status of a book and/or a fourth sub-filtering item for characterizing the book score of a book. Exemplarily, the fourth sub-filtering item may be the high score filtering item in FIG. 2, wherein the high score may specifically be a book score greater than a set threshold, for example, a book score greater than 9 points. For the step of generating second filtering items based on target attribute characteristics, it may be implemented according to following steps:

in a case that it is determined that there is a book whose update status is a completed status based on the book update status of each of the books indicated by the target attribute characteristics, generating the third sub-filtering item.

Here, the target attribute characteristics may indicate a book update status of individual books.

Exemplarily, for each book in a topic post, it may be determined according to the book update status of the book indicated by the target attribute characteristics, whether the book is in a completed status, and if so, it may be determined that the book has a target filtering item indicating the completed status, and a third sub-filtering item for characterizing the completed status is generated. Wherein, it is possible to generate the third sub-filtering item in a case that it is determined that there is a book whose update status is in the completed state, or generate the third sub-filtering item in a case that there is a fourth preset number of books in the completed state. On the contrary, in a case that it is determined that all of the book update status of various book are not the completed status, the third sub-filtering item may not be generated, that is, it may be determined that the book recommendation topic does not have a target filtering item for characterizing the completed status.

And/or, in a case that it is determined that there is a book with a book score greater than a set threshold based on the book score of each of the books indicated by the target attribute characteristics, generating the fourth sub-filtering item.

Here, the target attribute characteristics may indicate book scores of various books.

Exemplarily, for each book in a topic post, it may be determined according to the book update status of the book indicated by target attribute characteristics whether the book score of the book is greater than a set threshold. If so, it may be determined that the book has a target filtering item indicating high score of the book, and a fourth sub-filtering item that characterizes the high score of the book is generated. Wherein, it is possible to generate the fourth sub-filtering item in a case that it is determined that there is a book with a book score greater than the set threshold, or generate the fourth sub-filtering item in a case that there is a fifth preset number of books with a score greater than the set preset threshold. On the contrary, in a case that it is determined that all of the book scores of various books are not greater than the preset threshold, the fourth sub-filtering item may not be generated, that is, it may be determined that the book recommendation topic does not have a target filtering item for characterizing the high score.

In this way, by generating the third sub-filtering item and the fourth sub-filtering item, a general target filtering item may be obtained, thereby satisfying the filtering by users on various topic posts under book recommendation topics in a conventional manner.

S2: determining the target filtering items based on the at least one first filtering item and the at least one second filtering item.

Exemplarily, after obtaining at least one first filtering item and at least one second filtering item, each of the first filtering items and each of the second filtering items may be directly used as target filtering items; or any number of the first filtering items and the second filtering items may be selected as target filtering items.

In some embodiments, for S2, it may be implemented according to the following steps:

S2-1: determining the number of filtering items corresponding to a target type according to the type of each of the second filtering items.

Here, the type of the second filtering item may specifically include the types corresponding to the above first sub-filtering item, second sub-filtering item, third sub-filtering item and fourth sub-filtering item, respectively. The target type may be a type corresponding to the book type of interest, and the second filtering item of the target type is the first sub-filtering item.

Exemplarily, it is possible to filter out first sub-filtering items according to the type of each of the second filtering items from the second filtering items and determine the number of the first sub-filtering items, which is the number of filtering items.

S2-2: in a case that the number of filtering items is greater than a first preset number, determining sorting orders of individual second filtering items of the target type according to a first number of books corresponding to each second filtering item of the target type in order from high to low in quantity.

Here, the above first preset number may be set according to experience, which is not specifically limited in the embodiments of the present disclosure. For example, the first preset number may be 5, 6, etc. The first number of books corresponding to the second filtering item of the target type is the number of first books in the book type of interest corresponding to the second filtering item. Exemplarily, in a case that the number of filtering items is greater than the first preset number, each of the second filtering items of the target type may be sorted according to the first number corresponding to each of the second filter items of the target type in order from high to low in quantity, to obtain the sort order of individual second filter items.

S2-3: taking the second filtering items whose sorting order is greater than a preset order, the at least one first filtering item, and other second filtering items than the second filtering items of the target type as the target filtering items.

Here, other second filtering items other than the second filtering items of the target type may include one or more of the second sub-filtering item, the third sub-filtering item and the fourth sub-filtering item. The preset order may be set according to the maximum number of book types of interest that need to be displayed, which is not specifically limited in the embodiments of the present disclosure. For example, when the maximum number of book types of interest that need to be displayed is 2, the preset order may be 2.

Exemplarily, the second filtering items of the target type with a sorting order greater than 2, at least one first filtering item, and other second filtering items than the second filtering items of the target type may be taken as the final determined target filtering items.

In this way, by filtering the second filtering items of some target types, the displayed second filtering items can be enabled to characterize the book types that the user is most interested in, thereby improving filtering experience of the user.

In some embodiments, for the step of generating a first filtering item based on recommendation keywords, it may be implemented according to the following sub-steps:

Sub-step 1. for each topic post, filtering out candidate keywords corresponding to the topic post according to the similarity between each of the recommendation keywords in the topic post and topic information of a book recommendation topic.

Here, the topic information of the book recommendation topic is text information of the book recommendation topic. For example, if the book recommendation topic is "If you could traverse, you want to be . . . ", the topic information would be "If you could traverse, you want to be . . . ", and if the book recommendation topic is "Short of books, and high-scoring romantic novels can be recommended", the topic information would be "Short of books, and high-scoring romantic novels can be recommended". The candidate keywords are those keywords whose similarity to the topic information is greater than a preset similarity threshold among the recommendation keywords corresponding to the topic post. Wherein, the preset similarity threshold may be set according to experience, which is not specifically limited in the embodiments of the disclosure. For example, the preset similarity threshold may be 0.7, 0.8, 0.9, etc.

During specific implementation, for each topic post, the similarities between each of the recommendation keywords in the topic post and the topic information of the book recommendation topic may be calculated respectively. Wherein, the similarity between recommendation keywords and topic information may use length-adaptive distance editing calculation methods, cosine similarity algorithms, Manhattan distance calculation algorithms, etc. Afterwards, according to the calculated similarity, candidate keywords whose corresponding similarity is greater than the preset similarity threshold may be filtered out from various recommendation keywords in the topic post.

Sub-step 2: determining the target number of topic posts corresponding to each of the candidate keywords according to the candidate keywords corresponding to each topic post.

Exemplarily, based on the above sub-step 1, the candidate keywords corresponding to each topic post may be determined, and then a first number of the topic posts corresponding to each candidate keyword may be determined according to the candidate keywords corresponding to each topic post. Wherein, the target number may be understood as, for one candidate keyword, the number of topic posts that include the candidate keyword in the corresponding book recommendation information.

Sub-step 3: determining at least one target keyword based on the number of targets corresponding to each of the candidate keywords, and generating at least one first filtering item based on the determined at least one target keyword.

Here, the target keywords are keywords filtered out from the candidate keywords, and their corresponding target number is greater than a preset number threshold, wherein the preset number threshold may be set according to experience, which is not specifically limited in the embodiments of the present disclosure. For example, the preset number threshold may be 6, 8, 10, etc.

Exemplarily, according to the target number corresponding to each of the candidate keywords respectively, target keywords whose corresponding target number is greater than the preset number threshold may be filtered out from the candidate keywords. Alternatively, the sorting order of each of the candidate keywords may be determined by sorting each of the candidate keywords in descending order according to the target number corresponding to each of the candidate keywords, and candidate keywords whose sorting order is before a specified order are taken as target keywords.

After obtaining the target keywords, each of target keywords may be directly used as the name of a target filtering item, and further the target filtering item characterizing each of the target keywords may be generated. Here, after generating each of target filtering items, the display position of the target filtering item corresponding to each of the target keywords in the details page may also be determined according to the target number or sorting order corresponding to each of the target keywords. For example, the display position of the target filtering item with the largest corresponding target number (or the highest sort order) is located at the leftmost position of the area where the target filtering items are located on the details page, and the display position of the target filtering item with the smallest corresponding target number (or the lowest sort order) is located at the rightmost position.

Those skilled in the art can understand that in the above methods of the specific embodiments, the writing order of each step does not mean a strict execution order and constitutes any limitation on the implementation process. The specific execution order of each step should be determined based on its function and possible internal logic.

Based on the same inventive concept, the embodiments of the present disclosure further provides a display apparatus corresponding to the display method. Since the problem-solving principle of the apparatus in the embodiments of the present disclosure is similar to the above display method in the embodiments of the present disclosure, the implementation of the apparatus may be referred to the implementation of the method, which will not be repeated here again.

Figure 5:
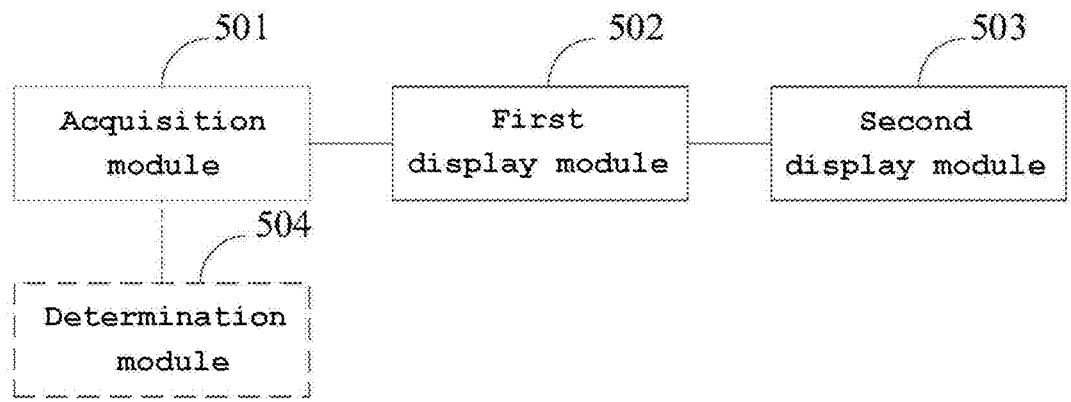
FIG. 5 shows a schematic diagram of a display apparatus provided by some embodiments of the present disclosure.

As shown in FIG. 5, it is a schematic diagram of a display apparatus provided by some embodiments of the present disclosure, comprising:
an Acquisition module 501 configured to, in response to a trigger operation for any of book recommendation topics, acquire a plurality of topic posts under the book recommendation topic, and target filtering items matching the topic posts; wherein the target filtering items are determined based on book recommendation information of the topic posts and book information recommended in the topic posts;
  a first display module 502 configured to display the target filtering items;
  a second display module 503 configured to, in response to one of the target filtering items being selected, display topic posts associated with the one of the target filtering items.

In one possible implementation, the apparatus further comprises a determination module 504 configured to determine target filtering items matching topic posts according to the following manners:
  determine target attribute characteristics according to common information of various books corresponding to book information recommended in the topic posts;
  extract recommendation keywords from the book recommendation information of the topic posts using the target attribute characteristics;
  generate the target filtering items based on the recommendation keywords and the target attribute characteristics.

In one possible implementation, the determination module 504 is configured to, when extracting recommendation keywords from book recommendation information of the topic posts using the target attribute characteristics:
  segment the book recommendation information of each of the topic posts respectively according to preset segmentation dimensions, to obtain at least one initial keyword of each of the topic posts under the preset segmentation dimensions; wherein, the preset segmentation dimension includes at least one of a first segmentation dimension determined according to the relationship between characters in a book, a second segmentation dimension determined according to the personalities of characters in a book, and a third segmentation dimension determined according to part-of-speech attributes;
  filter out recommendation keywords that match the target attribute characteristics.

In one possible implementation, the determination module 504 is configured to, when generating the target filtering items based on the recommendation keywords and the target attribute characteristics:
  generate at least one first filtering item based on the recommendation keywords, and generating at least one second filtering item based on the target attribute characteristics;
  determine the target filtering items based on the at least one first filtering item and the at least one second filtering item.

In one possible implementation, the determination module 504 is configured to, when determining the target filtering items based on the at least one first filtering item and the at least one second filtering item:
  determine the number of filtering items corresponding to a target type according to the type of each of the second filtering items;
  in a case that the number of filtering items is greater than a first preset number, determine sorting orders of individual second filtering items of the target type according to a first number of books corresponding to each second filtering item of the target type in order from high to low in quantity;
  take the second filtering items whose sorting order is greater than a preset order, the at least one first filtering item, and other second filtering items than the second filtering items of the target type as the target filtering items.

In one possible implementation, the second filtering item includes a first sub-filtering item for characterizing a book type of a book;
The determination module 504 is configured to, when the generating at least one second filtering item based on the target attribute characteristics:

recognize the book recommendation topics semantically to determine book search intention; the book search intention being used to indicate attribute characteristics of the book to be found corresponding to the book recommendation topics;

in a case that the type of the book search intention complies with a first preset type, acquire reading type indication information corresponding to the user who triggers the book recommendation topic; the first preset type including a non-directional type and/or a score being higher than a set threshold type; the reading type indication information being used to indicate each of book types of interest;

determine a second number of a first book under each of the book types of interest according to the book type of each of the books indicated by the target attribute characteristics;

generate at least one of the first sub-filtering items according to the corresponding second number of book types of interest being greater than a second preset number.

In one possible implementation, the second filtering item includes a second sub-filtering item for characterizing a book genre of a book;

The determination module 504 is configured to, when the generating at least one second filtering item based on the target attribute characteristics:

in a case that the type of book search intention meets a second preset type, determine a third number of topic posts in the book recommendation topics; the second preset type including at least one preset book genre type;

in a case that the third number is greater than a third preset number, determine a fourth number of a second book that matches the type of the book search intention according to the book genre of each of the book indicated by the target attribute characteristics;

in a case that the ratio between the fourth number and the total number of books corresponding to the book information is greater than a preset ratio, generate at least one of the second sub-filtering items according to the type of the book search intention.

In one possible implementation, the second filtering item includes a third sub-filtering item for characterizing a completed status of a book and/or a fourth sub-filtering item for characterizing a book score of a book;

The determination module 504, when the generating at least one second filtering item based on the target attribute characteristics:

in a case that it is determined that there is a book whose update status is a completed status based on the book update status of each of the books indicated by the target attribute characteristics, generating the third sub-filtering item; and/or in a case that it is determined that there is a book with a book score greater than a set threshold based on the book score of each of the books indicated by the target attribute characteristics, generating the fourth sub-filtering item.

For the description of the processing flow of each module in the apparatus and the interaction flow between various modules, it may refer to the relevant descriptions in the above method embodiments, which will not be repeated in detail here again.

In the display method, apparatus, computer device and storage medium provided by the embodiments of the present disclosure, since the filtering items are determined based on the book recommendation information of each topic post and the book information recommended in each topic post, each of the acquired target filtering items can be associated with attribute information of a certain number of topic posts. By acquiring and displaying target filtering items that match a topic post, users may be provided with filtering options, and then by responding to one of the target filtering items being selected, and displaying topic posts associated with the one of target filtering items on current page, it is possible to implement that each topic post under the book recommendation topic can be flexibly filtered according to each target filtering item to obtain topic posts that are in line with the needs of finding books. Then, the filtered topic posts are used to search for books, which can effectively improve the efficiency of book search.

That is to say, the display method provided by the embodiments of the present disclosure facilitates users to filter topic posts under book recommendation topics according to target filtering items through displayed target filtering items, to obtain topic posts that are more in line with the needs of finding books. Then the filtered topic posts are used to search for books, which can effectively improve the efficiency of book search.

Figure 6:
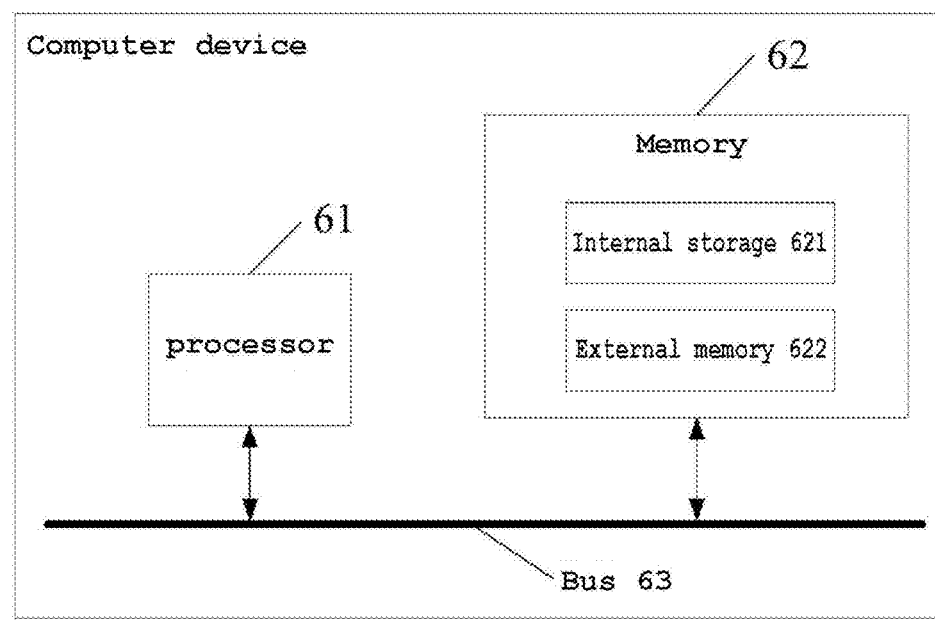
FIG. 6 shows a schematic structural diagram of a computer device provided by some embodiments of the present disclosure.

Based on the same technical concept, some embodiments of the present application further provide a computer device. Referring to FIG. 6, it is a schematic structural diagram of a computer device provided by some embodiments of the present application, comprising:

a processor 61, a memory 62 and a bus 63. Wherein, the memory 62 stores machine-readable instructions executable by the processor 61, and the processor 61 is configured to execute the machine-readable instructions stored in the memory 62. When the machine-readable instructions are executed by the processor 61, the processor 61 executes the following steps: S101: in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts; S102: displaying target filtering items and S103: in response to one of the target filtering items being selected, displaying topic posts associated with the one of target filtering items.

The above memory 62 includes an internal storage 621 and an external memory 622; the internal storage 621 here is also called an internal memory, which is used to temporarily store operation data in the processor 61, and data exchanged with the external memory 622 such as a hard disk. The processor 61 exchanges data with the external memory 622 through the internal storage 621. When the computer device is running, the processor 61 and the memory 62 communicate through the bus 63, so that the processor 61 executes the execution instructions mentioned in the above method embodiments.

Some embodiments of the present disclosure further provide a computer-readable storage medium having a computer program stored thereon, which, when run by a processor, executes the steps of the display method in the above method embodiments. Wherein, the storage medium may be a volatile or non-volatile computer-readable storage medium.

The computer program product of the display method provided by the embodiments of the present disclosure includes a computer-readable storage medium storing program code. Instructions included in the program code may be configured to execute the steps of the display method in the above method embodiments, which may refer to the above method embodiments and will not be repeated here again.

The computer program product may be specifically implemented by hardware, software or a combination thereof. In some embodiments, the computer program product is embodied as a computer storage medium. In other embodiments, the computer program product is embodied as a software product, such as a Software Development Kit (SDK), etc.

Those skilled in the art can clearly understand that for the convenience and simplicity of description, the specific working process of the above apparatus may be referred to the corresponding process in the foregoing method embodiments, which will not be repeated here again. In the several embodiments provided in this disclosure, it should be understood that the disclosed apparatus and methods may be implemented in other ways. The apparatus embodiments described above are only illustrative. For example, the division of the units is only a logical function division. In actual implementation, there may be other division methods. For another example, multiple units or components may be combined, or some features may be ignored, or not executed. On the other hand, the coupling or direct coupling or communication connection between each other shown or discussed may be through some communication interfaces, and the indirect coupling or communication connection of the apparatus or units may be in the form of electrical, mechanical or other forms.

The units described as separate components may or may not be physically separated, and the components shown as units may or may not be physical units, that is, they may be located in one place, or they may be distributed to multiple network units. Some or all of the units may be selected according to actual needs to achieve the purpose of the solution of the embodiments.

In addition, each functional unit in various embodiments of the present disclosure may be integrated into one processing unit, or each unit may exist physically alone, or two or more units may be integrated into one unit.

If the functions are implemented in the form of software functional units and sold or used as independent products, they may be stored in a non-volatile computer-readable storage medium that is executable by a processor. Based on such understanding, the technical solution of the present disclosure is essentially or for the part that contributes to existing technology or the part of the technical solution may be embodied in the form of a software product. The computer software product is stored in a storage medium, including several instructions used to cause a computer device (which may be a personal computer, a server, or a network device, etc.) to execute all or part of the steps of the methods in various embodiments of the present disclosure. While the aforementioned storage media include: U disk, mobile hard disk, Read-Only Memory (ROM), Random Access Memory (RAM), magnetic disk or optical disk and other media that can store program code.

If the technical solution of this application involves personal information, the products applying the technical solution of this application must clearly inform the personal information processing rules and obtain the individual's independent consent before processing personal information. If the technical solution in this application involves sensitive personal information, the products applying the technical solution in this application must obtain the individual's separate consent and meet the requirement of "express consent" at the same time before processing sensitive personal information. For example, setting clear and conspicuous signs at personal information collection apparatus such as cameras to inform that a scope of collecting personal information has been entered, and personal information will be collected, and if an individual voluntarily enters the collection scope, it is deemed to have agreed to the collection of his or her personal information; or on a personal information processing apparatus, in a case that using obvious logos/information to inform personal information processing rules, personal authorization is obtained through pop-up messages or asking individuals to upload their personal information; wherein, personal information processing rules may include personal information processing processors, purposes of personal information processing, processing methods, types of personal information processed, etc.

Finally, it should be noted that the above embodiments are only specific embodiments of the present disclosure, and are used to illustrate, not limit the technical solutions of the present disclosure. The protection scope of the present disclosure is not limited thereto. Although the present disclosure has been described in detail with reference to the foregoing embodiments, those of ordinary skill in the art should understand that any person familiar with the technical field can still make modifications or easily conceive of changes to the technical solutions recorded in the foregoing embodiments within the technical scope disclosed in the present disclosure, or make equivalent substitutions to some of the technical features; and these modifications, changes or substitutions do not cause the essence of the corresponding technical solution to deviate from the spirit and scope of the technical solution of the embodiments of the present disclosure, and they should all be covered within the scope of this disclosure. Therefore, the protection scope of the present disclosure should be defined by the protection scope of the claims.

What is claimed is:

1. A display method, comprising:
   in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts;
   displaying the target filtering items; and
   in response to one of the target filtering items being selected, displaying topic posts associated with the one of the target filtering items,
   wherein the target filtering items matching the topic posts are determined by:
   determining target attribute characteristics according to common information of various books corresponding to the book information recommended in the topic posts;
   segmenting the book recommendation information of each of the topic posts respectively according to preset segmentation dimensions, to obtain at least one initial keyword of each of the topic posts under the preset segmentation dimensions;
   filtering out recommendation keywords that match the target attribute characteristics from the initial keywords; and
   generating the target filtering items based on the recommendation keywords and the target attribute characteristics.

2. The method according to claim 1, wherein the preset segmentation dimension includes at least one of a first segmentation dimension determined according to the relationship between characters in a book, a second segmentation dimension determined according to the personalities of characters in a book, and a third segmentation dimension determined according to part-of-speech attributes.

3. The method according to claim 1, wherein generating the target filtering items based on the recommendation keywords and the target attribute characteristics comprises:
generating at least one first filtering item based on the recommendation keywords, and generating at least one second filtering item based on the target attribute characteristics;
determining the target filtering items based on the at least one first filtering item and the at least one second filtering item.

4. The method of claim 3, wherein determining the target filtering items based on the at least one first filtering item and the at least one second filtering item comprises:
determining the number of filtering items corresponding to a target type according to the type of each of the second filtering items;
in a case that the number of filtering items is greater than a first preset number, determining sorting orders of individual second filtering items of the target type according to a first number of books corresponding to each second filtering item of the target type in order from high to low in quantity;
taking the second filtering items whose sorting order is greater than a preset order, the at least one first filtering item, and other second filtering items than the second filtering items of the target type as the target filtering items.

5. The method according to claim 3, wherein the second filtering item includes a first sub-filtering item for characterizing a book type of a book;
the generating at least one second filtering item based on the target attribute characteristics comprising:
recognizing the book recommendation topics semantically to determine book search intention; the book search intention being used to indicate attribute characteristics of the book to be found corresponding to the book recommendation topics;
in a case that the type of the book search intention complies with a first preset type, acquiring reading type indication information corresponding to the user who triggers the book recommendation topic; the first preset type including at least one of a non-directional type and a score being higher than a set threshold type; the reading type indication information being used to indicate each of book types of interest;
determining a second number of a first book under each of the book types of interest according to the book type of each of the books indicated by the target attribute characteristics;
generating at least one of the first sub-filtering items according to the corresponding second number of book types of interest being greater than a second preset number.

6. The method according to claim 3, wherein the second filtering item includes a second sub-filtering item for characterizing a book genre of a book;
the generating at least one second filtering item based on the target attribute characteristics comprising:
in a case that the type of book search intention meets a second preset type, determining a third number of topic posts in the book recommendation topics; the second preset type including at least one preset book genre type;
in a case that the third number is greater than a third preset number, determining a fourth number of a second book that matches the type of the book search intention according to the book genre of each of the book indicated by the target attribute characteristics;
in a case that the ratio between the fourth number and the total number of books corresponding to the book information is greater than a preset ratio, generating at least one of the second sub-filtering items according to the type of the book search intention.

7. The method according to claim 3, wherein the second filtering item includes at least one of a third sub-filtering item for characterizing a completed status of a book or a fourth sub-filtering item for characterizing a book score for a book;
the generating at least one second filtering item based on the target attribute characteristics comprises at least one of:
in a case that it is determined that there is a book whose update status is a completed status based on the book update status of each of the books indicated by the target attribute characteristics, generating the third sub-filtering item; and
in a case that it is determined that there is a book with a book score greater than a set threshold based on the book score of each of the books indicated by the target attribute characteristics, generating the fourth sub-filtering item.

8. A computer device, comprising: a processor and a memory having machine-readable instructions executable by the processor stored thereon, the processor being configured to execute the machine-readable instructions stored in the memory, when the machine-readable instructions are executed by the processor, executes a display method, the display method comprises:
in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts;
displaying the target filtering items; and
in response to one of the target filtering items being selected, displaying topic posts associated with the one of the target filtering items,
wherein the target filtering items matching the topic posts are determined by:
determining target attribute characteristics according to common information of various books corresponding to the book information recommended in the topic posts;
segmenting the book recommendation information of each of the topic posts respectively according to preset segmentation dimensions, to obtain at least one initial keyword of each of the topic posts under the preset segmentation dimensions;
filtering out recommendation keywords that match the target attribute characteristics from the initial keywords; and
generating the target filtering items based on the recommendation keywords and the target attribute characteristics.

9. The computer device according to claim 8, wherein the preset segmentation dimension includes at least one of a first segmentation dimension determined according to the relationship between characters in a book, a second segmentation dimension determined according to the personalities of characters in a book, and a third segmentation dimension determined according to part-of-speech attributes.

10. The computer device according to claim 8, wherein generating the target filtering items based on the recommendation keywords and the target attribute characteristics comprises:
generating at least one first filtering item based on the recommendation keywords, and generating at least one second filtering item based on the target attribute characteristics;
determining the target filtering items based on the at least one first filtering item and the at least one second filtering item.

11. A non-transitory computer-readable storage medium, the computer-readable storage medium having a computer program stored thereon, which, when run by a computer device, the computer device executes a display method, the display method comprises:
in response to a trigger operation for any of book recommendation topics, acquiring a plurality of topic posts under the book recommendation topic, and target filtering items matching the topic posts; wherein the target filtering items are determined based on book recommendation information of the topic posts and book information recommended in the topic posts;
displaying the target filtering items; and
in response to one of the target filtering items being selected, displaying topic posts associated with the one of the target filtering items,
wherein the target filtering items matching the topic posts are determined by:
determining target attribute characteristics according to common information of various books corresponding to the book information recommended in the topic posts;
segmenting the book recommendation information of each of the topic posts respectively according to preset segmentation dimensions, to obtain at least one initial keyword of each of the topic posts under the preset segmentation dimensions;
filtering out recommendation keywords that match the target attribute characteristics from the initial keywords; and
generating the target filtering items based on the recommendation keywords and the target attribute characteristics.

12. The non-transitory computer-readable storage medium according to claim 11, wherein the preset segmentation dimension includes at least one of a first segmentation dimension determined according to the relationship between characters in a book, a second segmentation dimension determined according to the personalities of characters in a book, and a third segmentation dimension determined according to part-of-speech attributes.

13. The non-transitory computer-readable storage medium according to claim 11, wherein generating the target filtering items based on the recommendation keywords and the target attribute characteristics comprises:
generating at least one first filtering item based on the recommendation keywords, and generating at least one second filtering item based on the target attribute characteristics;
determining the target filtering items based on the at least one first filtering item and the at least one second filtering item.

14. The non-transitory computer-readable storage medium according to claim 13, wherein determining the target filtering items based on the at least one first filtering item and the at least one second filtering item comprises:
determining the number of filtering items corresponding to a target type according to the type of each of the second filtering items;
in a case that the number of filtering items is greater than a first preset number, determining sorting orders of individual second filtering items of the target type according to a first number of books corresponding to each second filtering item of the target type in order from high to low in quantity;
taking the second filtering items whose sorting order is greater than a preset order, the at least one first filtering item, and other second filtering items than the second filtering items of the target type as the target filtering items.

15. The non-transitory computer-readable storage medium according to claim 13, wherein the second filtering item includes a first sub-filtering item for characterizing a book type of a book;
the generating at least one second filtering item based on the target attribute characteristics comprising:
recognizing the book recommendation topics semantically to determine book search intention; the book search intention being used to indicate attribute characteristics of the book to be found corresponding to the book recommendation topics;
in a case that the type of the book search intention complies with a first preset type, acquiring reading type indication information corresponding to the user who triggers the book recommendation topic; the first preset type including at least one of a non-directional type and a score being higher than a set threshold type; the reading type indication information being used to indicate each of book types of interest;
determining a second number of a first book under each of the book types of interest according to the book type of each of the books indicated by the target attribute characteristics;
generating at least one of the first sub-filtering items according to the corresponding second number of book types of interest being greater than a second preset number.

16. The non-transitory computer-readable storage medium according to claim 13, wherein the second filtering item includes a second sub-filtering item for characterizing a book genre of a book;
the generating at least one second filtering item based on the target attribute characteristics comprising:
in a case that the type of book search intention meets a second preset type, determining a third number of topic posts in the book recommendation topics; the second preset type including at least one preset book genre type;
in a case that the third number is greater than a third preset number, determining a fourth number of a second book that matches the type of the book search intention according to the book genre of each of the book indicated by the target attribute characteristics;
in a case that the ratio between the fourth number and the total number of books corresponding to the book information is greater than a preset ratio, generating at least one of the second sub-filtering items according to the type of the book search intention.

17. The non-transitory computer-readable storage medium according to claim 13, wherein the second filtering item includes at least one of a third sub-filtering item for characterizing a completed status of a book and a fourth sub-filtering item for characterizing a book score for a book;
- the generating at least one second filtering item based on the target attribute characteristics comprises at least one of:
- in a case that it is determined that there is a book whose update status is a completed status based on the book update status of each of the books indicated by the target attribute characteristics, generating the third sub-filtering item; and
- in a case that it is determined that there is a book with a book score greater than a set threshold based on the book score of each of the books indicated by the target attribute characteristics, generating the fourth sub-filtering item.

\* \* \* \* \*